United States Patent
He et al.

(10) Patent No.: US 12,081,120 B1
(45) Date of Patent: Sep. 3, 2024

(54) NEGATIVE CHARGE PUMP

(71) Applicant: MediaTek Singapore Pte. Ltd., Singapore (SG)

(72) Inventors: Fang He, Hefei Anhui (CN); Xming Zhu, Hefei Anhui (CN)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 0 days.

(21) Appl. No.: 18/296,516

(22) Filed: Apr. 6, 2023

(30) Foreign Application Priority Data

Mar. 7, 2023 (CN) .......................... 202310213946.5

(51) Int. Cl.
*H02M 3/07* (2006.01)
*H02M 1/00* (2006.01)

(52) U.S. Cl.
CPC ......... *H02M 3/071* (2021.05); *H02M 1/0012* (2021.05)

(58) Field of Classification Search
None
See application file for complete search history.

(56) References Cited

U.S. PATENT DOCUMENTS

| | | | |
|---|---|---|---|
| 4,539,551 A * | 9/1985 | Fujita | H03K 5/249 341/158 |
| 6,744,297 B2 * | 6/2004 | Huang | H03K 19/00361 326/122 |
| 8,242,834 B2 | 8/2012 | Chuang | |
| 8,283,970 B2 * | 10/2012 | Lin | H02M 3/07 327/536 |
| 8,674,750 B2 | 3/2014 | Lee | |
| 9,634,558 B2 | 4/2017 | Feng | |
| 10,270,363 B2 * | 4/2019 | Shimizu | H02M 3/07 |
| 10,855,177 B2 | 12/2020 | Chang | |
| 11,374,491 B2 * | 6/2022 | Lam | H02M 1/0032 |
| 2013/0207717 A1 * | 8/2013 | Matsuoka | G05F 1/10 327/536 |
| 2014/0103897 A1 * | 4/2014 | Wang | H03K 17/164 323/311 |

FOREIGN PATENT DOCUMENTS

| | | |
|---|---|---|
| KR | 1020110085698 A | 7/2011 |
| TW | 201513543 A | 4/2015 |
| TW | 202007061 A | 2/2020 |

OTHER PUBLICATIONS

Chinese language office action dated May 8, 2024, issued in application No. TW 112120680.

* cited by examiner

*Primary Examiner* — Thomas J. Hiltunen
(74) *Attorney, Agent, or Firm* — McClure, Qualey & Rodack, LLP

(57) ABSTRACT

A negative charge pump (NCP) with high reliability is shown. A first capacitor is coupled between the power terminal and the ground terminal while in the first state and disconnected from the power terminal and the ground terminal while in the second state. A second capacitor is coupled between the ground terminal and the output terminal of the NCP, wherein while in the second state, the second capacitor is further coupled in parallel with the first capacitor. The first capacitor is coupled to the power terminal and the ground terminal while in the first state through a first switch and the second switch, respectively. When switching from the second state to the first state, the first switch is closed before the second switch.

14 Claims, 6 Drawing Sheets

US 12,081,120 B1

NEGATIVE CHARGE PUMP

CROSS REFERENCE TO RELATED APPLICATIONS

This application claims priority of China Patent Application No. 202310213946.5, filed on Mar. 7, 2023, the entirety of which is incorporated by reference herein.

BACKGROUND OF THE INVENTION

Field of the Invention

The present invention relates to negative charge pumps.

Description of the Related Art

With the rapid development of mobile-entertainment electronic products, people's expectations for excellent audio playback quality (e.g., high-fidelity and high-power playback) have also increased. For high power demands, a negative charge pump (NCP) is required for generating a negative voltage to increase the output power. A design for a reliable negative charge pump is called for.

BRIEF SUMMARY OF THE INVENTION

A negative charge pump (NCP), in accordance with an exemplary embodiment of the present invention, has at least four switches and two capacitors. The first switch is controlled by a first control signal, and coupled between a power terminal and a first node. The second switch is controlled by a second control signal, and coupled between a ground voltage and a second node. The third switch is controlled by a third control signal, and coupled between the first node and the ground voltage. The forth switch is controlled by a forth control signal, and coupled between the second node and an output terminal of the NCP. The first capacitor is coupled between the first node and the second node. The second capacitor is coupled between the ground voltage and the output terminal. In a first state, the first switch and the second switch are turned on, and the third switch and the fourth switch are turned off. In a second state, the first switch and the second switch are turned off, and the third switch and the fourth switch are turned on. In an intermediate state after the second state and prior to the first state, the first switch turns on before the second switch.

In this manner, the transistors implementing the second switch are well protected.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
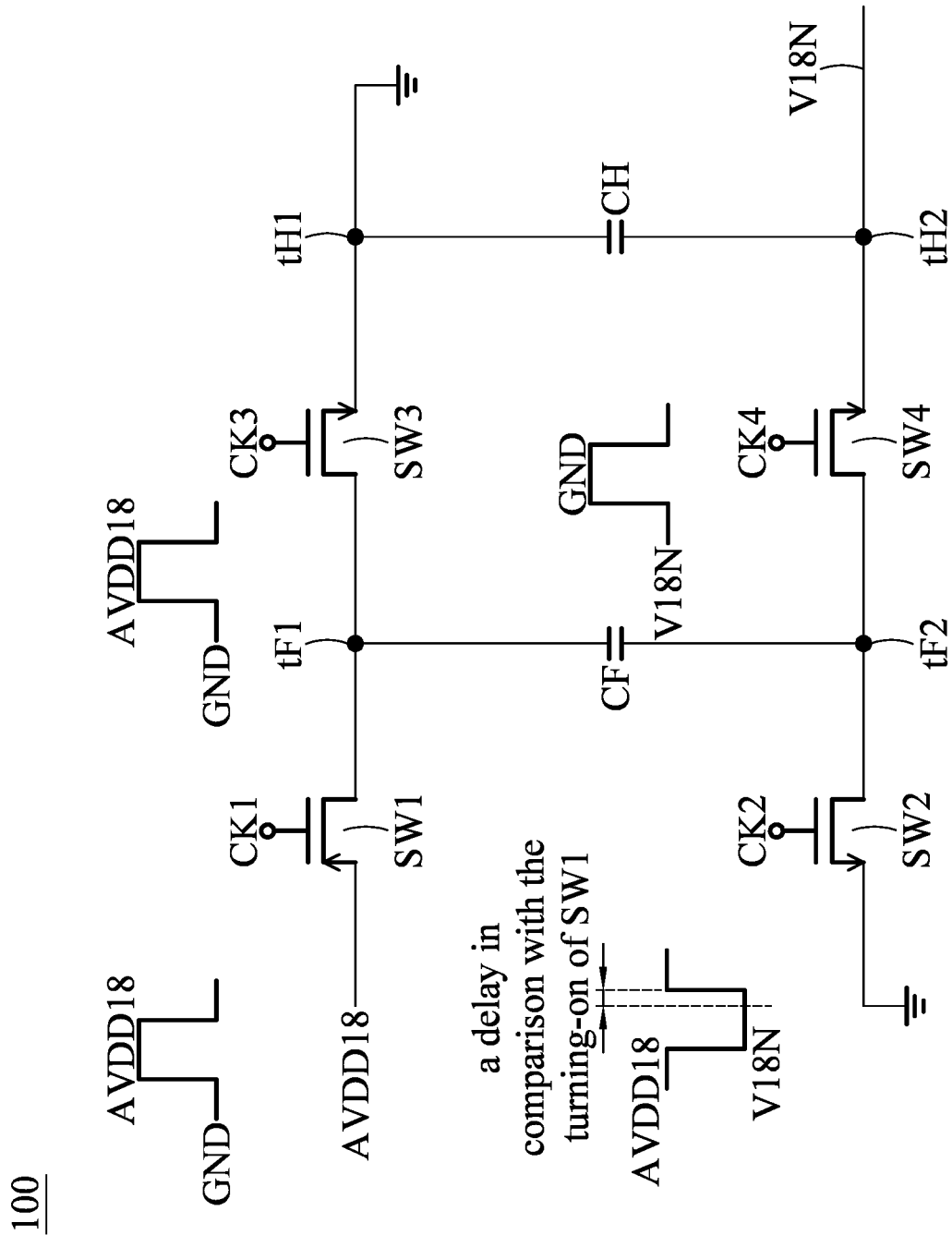
FIG. 1 illustrates a negative charge pump (NCP) 100 in accordance with an exemplary embodiment of the present invention.

FIG. 1 illustrates a negative charge pump (NCP) 100 in accordance with an exemplary embodiment of the present invention. Based on a positive power voltage AVDD18 (1.8V), the negative charge pump 100 generates a negative power voltage V18N (−1.8V). In the other examples, the voltage levels mentioned here may be replaced by the other numbers. It is not intend to limit the disclosed NCP architecture to a particular voltage level. In the following description, the positive power voltage is 1.8V and the negative power voltage is −1.8V. In the other examples, the positive power voltage and the negative power voltage may be replaced by the other values.

Referring back to FIG. 1, the negative charge pump 100 has a capacitor CF, a capacitor CH, and switches SW1~SW4.

The functions and connections of the capacitors CF and CH are described in this paragraph. While in the first state, switches SW1 and SW2 are turned on, switches SW3 and SW4 are turned off, the capacitor CF is coupled between the power terminal AVDD18 (1.8V) and the ground terminal (0V) to be charged to store a voltage 1.8V. The capacitor CH is always coupled between the ground terminal and the output terminal V18N of the negative charge pump 100. While in the second state, the switches SW1 and SW2 are turned off, the switches SW3 and SW4 are turned on, the capacitor CF (storing 1.8V) is disconnected from the power terminal AVDD18 and the ground terminal, but the capacitor CH is coupled in parallel with the capacitor CF. Thus, the capacitor CH guarantees a voltage difference, 1.8V, between the ground terminal (0V) and the output terminal V18N of the negative charge pump 100. The output terminal V18N of the negative charge pump 100 is regulated at −1.8V.

The switches SW1~SW4, implemented by MOSs, are provided to control the connections of the capacitors CF and CH. The switch SW1 is controlled by a control signal CK1 to couple the capacitor CF to the power terminal AVDD18 via the node tF1 while in the first state. The switch SW2 is controlled by a control signal CK2 to couple the capacitor CF to the ground terminal via the node tF2 while in the first state. The switch SW3 is controlled by a control signal CK3 to couple the node tF1 to the capacitor CH via the node tH1 while in the second state. The switch SW4 is controlled by a control signal CK4 to couple the node tF2 to the capacitor CH via the node tH2 while in the second state.

In the conventional design such as 3310 semiconductor process (e.g., transistors therein can sustain high voltage such as 3.3V), the switches SW2 and SW4 are implemented by high-voltage components (e.g., with thick gates in comparison with the thin gates of the low-voltage switches SW1 and SW3) which can sustain the high voltage difference up to 3.6V. However, the negative charge pump 100 of the present invention is implemented in 18IO semiconductor process (e.g., transistors therein can sustain voltage such as 1.8V), the four switches SW1~SW4 of the negative charge pump 100 are all low-voltage components. A special timing scheme is applied to control signal CK2, and control signal CK4 is limited to a special voltage range to operate the four switches SW1~ SW4 within a low-voltage range that is narrower than a high-voltage range. The high-voltage range is from −1.8V to 1.8V, which is defined by the negative power voltage (−1.8V, regulated at the output terminal V18N of the NCP 100, hereinafter also represented by V18N) and the positive power voltage (1.8V, at the power terminal AVDD18, hereinafter also represented by AVDD18). Instead of might being operated under a high voltage difference that may be up to 3.6V, the voltage difference between any two terminals of each of the switches SW1~SW4 is limited to be less than or equal to a low voltage difference 1.8V, therefore, enhancing the reliability of the switches and preventing them from being breakdown by high voltages.

As shown, the switch SW2 is an NMOS, whose source terminal is coupled to the ground terminal, drain terminal is coupled to the node tF2, and gate terminal is controlled by control signal CK2. To protect the switch SW2, the control signal CK1 turns on the switch SW1 before the turning on of the switch SW2 (e.g., referring to the rising edge of the control signal CK2). In this manner, before the high voltage AVDD18 is supplied to the gate terminal of the switch SW2, the node tF2 (coupled to the drain terminal of the switch SW2) is first pulled up (through the capacitor CF) to 0V due to the positive power voltage AVDD18 coupled to the node tF1. Thus, the switch SW2 does not sustain any high-voltage difference and is well protected from being damaged by a high-voltage difference between its gate terminal and drain terminal. The more details of the operations of the second switch SW2 will be described later.

Referring to the switch SW4, it is an NMOS having a source terminal coupled to the node tH2, a drain terminal coupled to the node tF2, and a gate terminal controlled by control signal CK4. Especially, control signal CK4 oscillates between the negative power voltage (−1.8V) and the ground voltage (0V) of the ground terminal. In this manner, the switch SW4 does not sustain any high-voltage difference.

In FIG. 1, the switch SW1 is a PMOS, having a source terminal coupled to the power terminal AVDD18, a drain terminal coupled to the node tF1, and a gate terminal controlled by control signal CK1. The control signal CK1 oscillates between the ground voltage (0V) and the positive power voltage (1.8V). The switch SW3 is an NMOS, having a source terminal coupled to the node tH1, a drain terminal coupled to the node tF1, and a gate terminal controlled by control signal CK3. The control signal CK3 oscillates between the ground voltage (0V) and the positive power voltage (1.8V). There may be variants of the switches SW1 and SW3.

Figure 2:
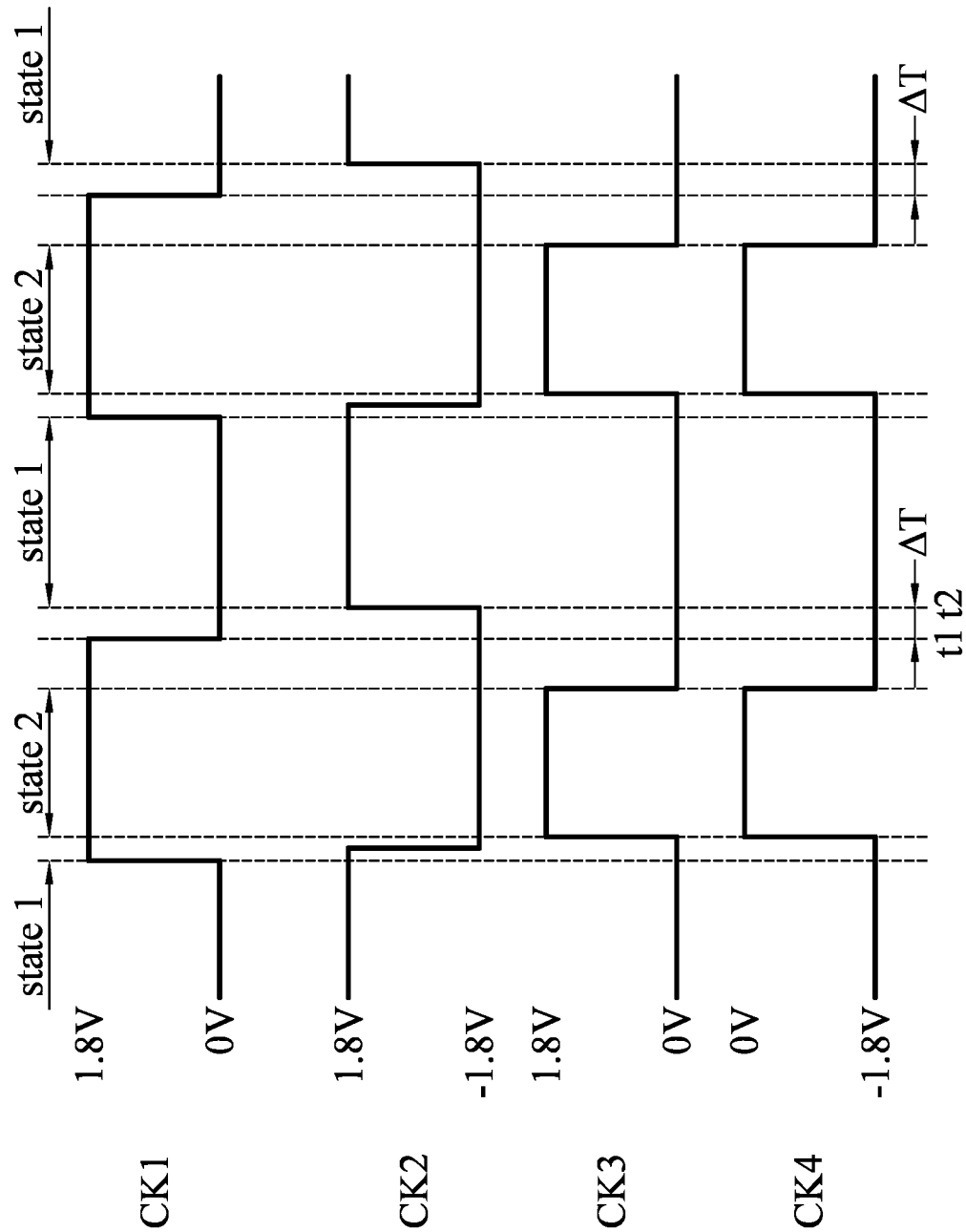
FIG. 2 is a timing diagram of the control signals CK1~CK4.

FIG. 2 is a timing diagram of the control signals CK1~CK4. While in the first state (state 1; wherein SW1 and SW2 are on, SW3 and SW4 are off, and the capacitor CF is coupled between AVDD18 and ground), control signal CK1 is at the ground voltage 0V, control signal CK2 is at the positive power voltage 1.8V, control signal CK3 is at the ground voltage 0V, and control signal CK4 is at the negative power voltage −1.8V. While in the second state (state 2; wherein SW1 and SW2 are off, SW3 and SW4 are on, and the capacitors CF and CH are connected in parallel), control signal CK1 is at the positive power voltage 1.8V, control signal CK2 is at the negative power voltage −1.8V, control signal CK3 is at the positive power voltage 1.8V, and control signal CK4 is at the ground voltage 0V. Especially, control signal CK1 turns on the switch SW1 by its falling edge, and the timing difference ΔT shows that the falling edge of control signal CK1 leads the rising edge of control signal CK2 (i.e., the turning on of the switch SW1 leads the turning on of the switch SW2 by the timing difference ΔT). Because of the timing difference ΔT between the falling edge of CK1 and the rising edge of CK2, the switch SW2 implemented by low-voltage component as the switches SW1 and SW3 is well protected from being damaged by any high voltage difference.

Figure 3B:
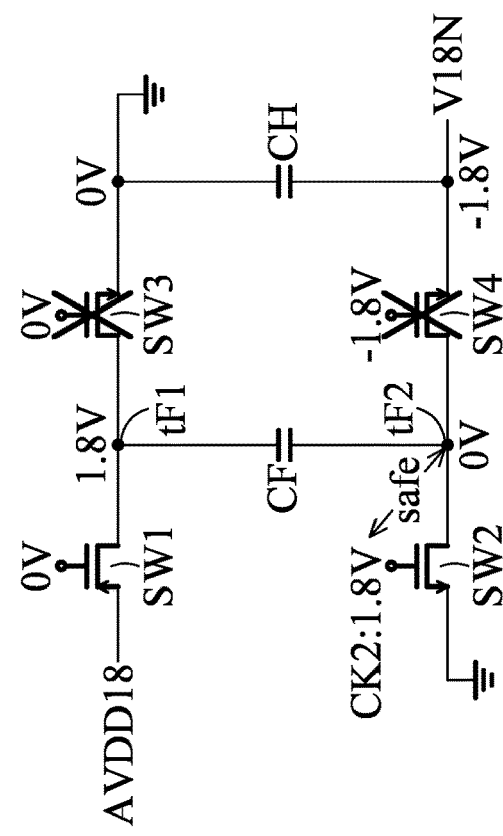
FIG. 3B depicts the circuit structure at the timing point t2.
Figure 3A:
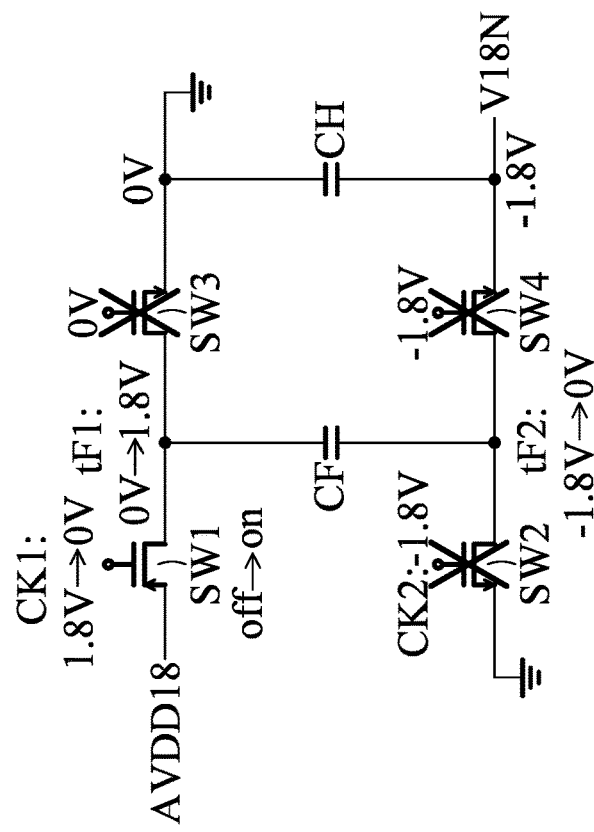
FIG. 3A depicts the circuit structure at the timing point t1.
Figure 3C:
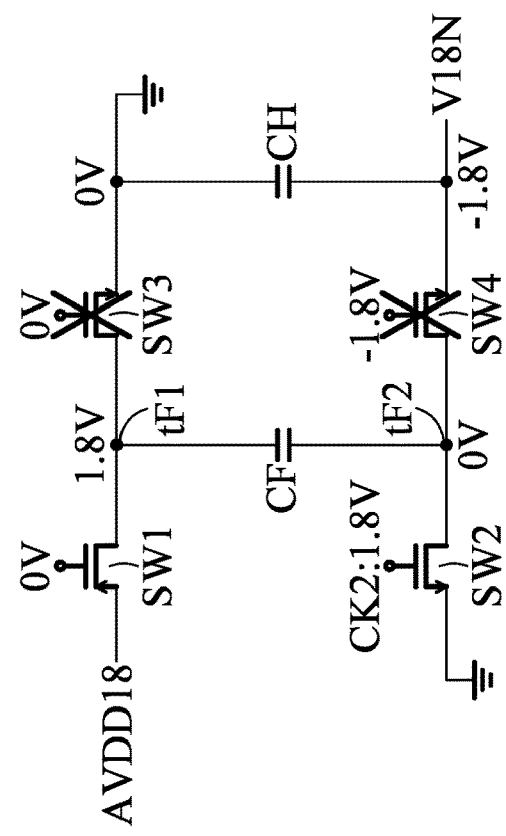
FIG. 3C depicts the circuit structure in state 2.
Figure 3D:
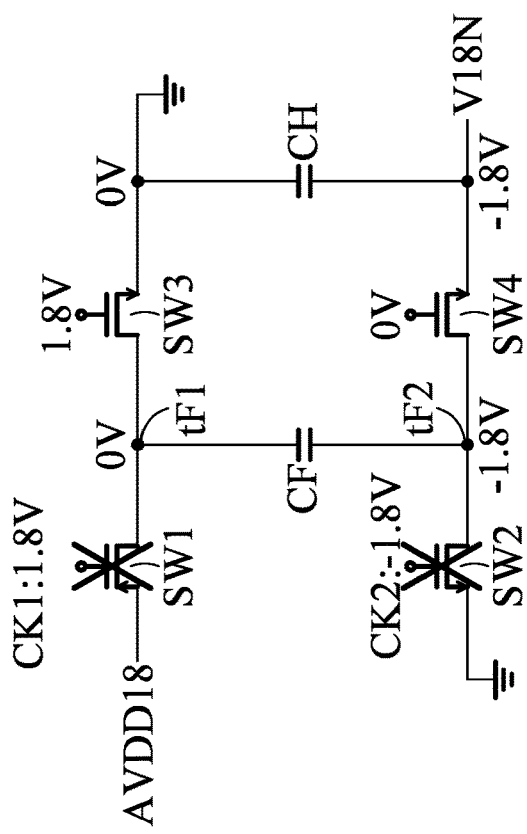
FIG. 3D depicts the circuit structure in state 1.

The circuit connections at the timing points t1 and t2 presented in FIG. 2 are discussed below. FIG. 3A depicts the circuit structure at the timing point t1. FIG. 3B depicts the circuit structure at the timing point t2. FIG. 3C depicts the circuit structure in state 2. FIG. 3D depicts the circuit structure in state 1.

As shown in FIG. 3C, in state 2, SW1 and SW2 are turned off, SW3 and SW4 are turned on, the nodes tF1 and tH1 are 0V, and the nodes tF2 and tH2 are −1.8V. As shown in FIG. 3D, in state 1, SW1 and SW2 are turned on, SW3 and SW4 are turned off, the node tF1 is changed to 1.8V, and the node tF2 is changed to 0V. The timing point t1 is after state 2 and prior to state 1 (e.g., in an intermediate state). The timing point t2 is after t1 and is for entering state 1.

Referring to FIG. 3A, the circuit connection at timing point t1 (after state 2 and prior to state 1) is shown. At the timing point t1, control signal CK1 is changing from 1.8V to 0V to turn on the switch SW1, but the control signal CK2 is kept at −1.8V to turn off the switch SW2. The node tF1 is changing from 0V to 1.8V and, through the capacitor CF, the node tF2 is changing from −1.8V to 0V. It shows that the node tF2 is pulled up to 0V before the switch SW2 is turned on. Thus, as shown in FIG. 3B, at the timing point t2 (entering state 1), although control signal CK2 is changed to 1.8V, the voltage difference between the gate terminal and the drain terminal of the NMOS of the switch SW2 is only 1.8V, which is within a safe region for the low-voltage NMOS. In the conventional design, during the changing from state 2 into state 1, the switch SW1 and switch SW2 are turned on simultaneously, at the moment of the turning on of the switch SW2, the gate voltage of SW2 is 1.8V and the drain voltage (i.e., the node tF2) is at the negative value of 1.8V, such that the voltage difference between its gate terminal and drain terminal would reach up to 3.6V, thus switch SW2 under 1810 semiconductor process has the risk of breakdown.

In the other exemplary embodiments, the implementations of the switches SW1~SW4 may have some variations. Any negative charge pump having the switch SW1 turned on prior to the switch SW2 should be considered within the scope of the present invention.

Figure 4:
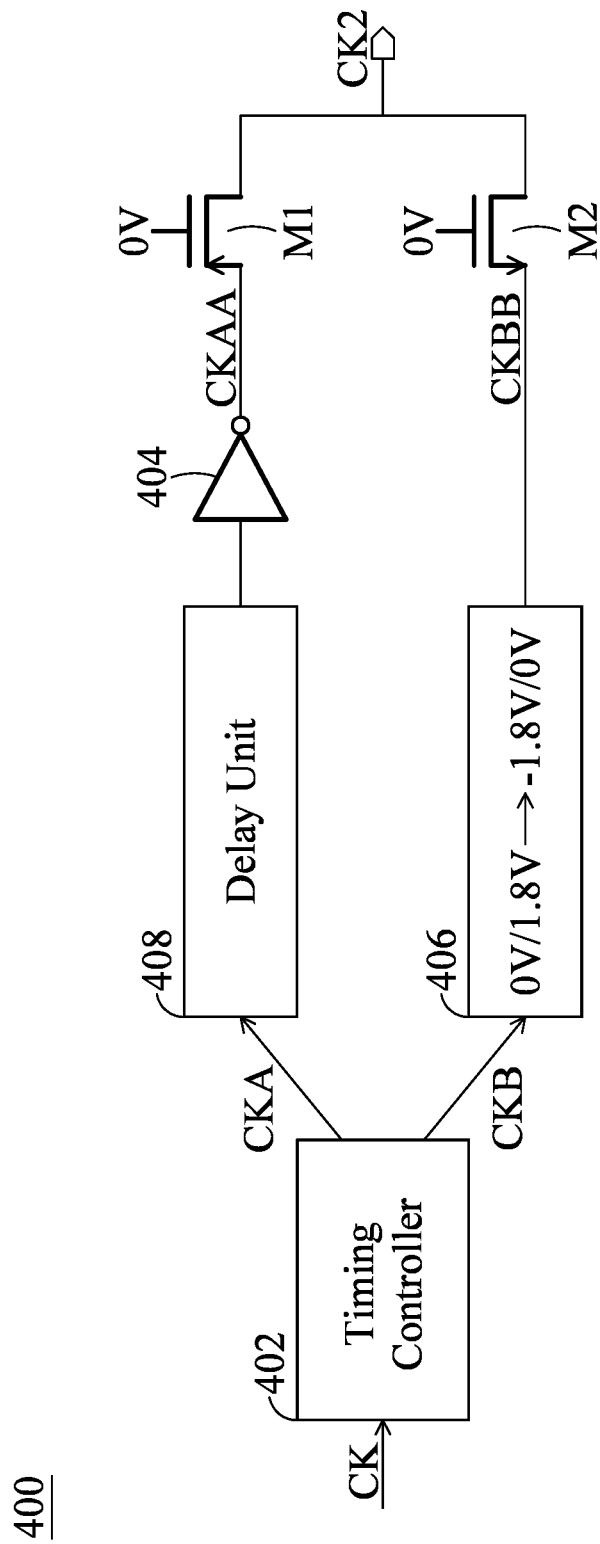
FIG. 4 illustrates a clock generator 400 generating control signal CK2 to be coupled to the gate terminal of the NMOS of the switch SW2.

The control signal CK2 is provided by a clock generator. In the conventional design such as 33IO semiconductor process, the switches in the clock generator are implemented by high-voltage components (e.g., with thick gates in comparison with the thin gates of the low-voltage switches) which can sustain the high voltage difference up to 3.6V. However, in the current 1810 semiconductor process, the switches of the clock generator are all low-voltage components. So, a new clock generator with low-voltage components is needed. FIG. 4 illustrates a clock generator 400 generating control signal CK2 to be coupled to the gate terminal of the NMOS of the switch SW2.

To protect the MOSs within the clock generator 400, the generated control signal CK2 has a rising slope and/or a falling slope. The clock generator 400 has two transistor switches M1 and M2, a timing controller 402, an inverter 404, a delay unit 408 and a level-shifter 406.

The timing controller 402 generates two clock signals CKA and CKB based on a source clock signal CK, wherein the high-state duration of the clock signal CKA covers (and is wider than) the low-state duration of the clock signal CKB, and the high-state duration of the clock signal CKB covers (and is wider than) the low-state duration of the clock signal CKA. The clock signal CKA and the clock signal CKB both oscillate between a first voltage range that is from the ground voltage 0V to the positive power voltage 1.8V. The clock signal CKA is coupled to the delay unit 408, and then is coupled to the inverter 404 to generate another clock signal CKAA (still oscillating between the first voltage range 0V~1.8V). The level-shifter 406 shifts the clock signal CKB from the first voltage range (0V/1.8V) to a second voltage range (−1.8V/0V) to generate another clock signal CKBB. The delay unit 408 generates a delay time according to the delay time caused by the level-shifter 406. The transistor switch M1 is turned on or off based on the clock signal CKAA, and the transistor switch M2 is turned on or off based on the clock signal CKBB.

As shown, the transistor switch M1 is a PMOS, having a source terminal coupled to the clock signal CKAA, a drain terminal coupled to the output terminal (CK2) of the clock generator 400, and a gate terminal coupled to the ground voltage (0V). The transistor switch M2 is an NMOS, having a source terminal coupled to the clock signal CKBB, a drain terminal coupled to the output terminal (CK2) of the clock generator 400, and a gate terminal coupled to the ground voltage (0V).

Figure 5:
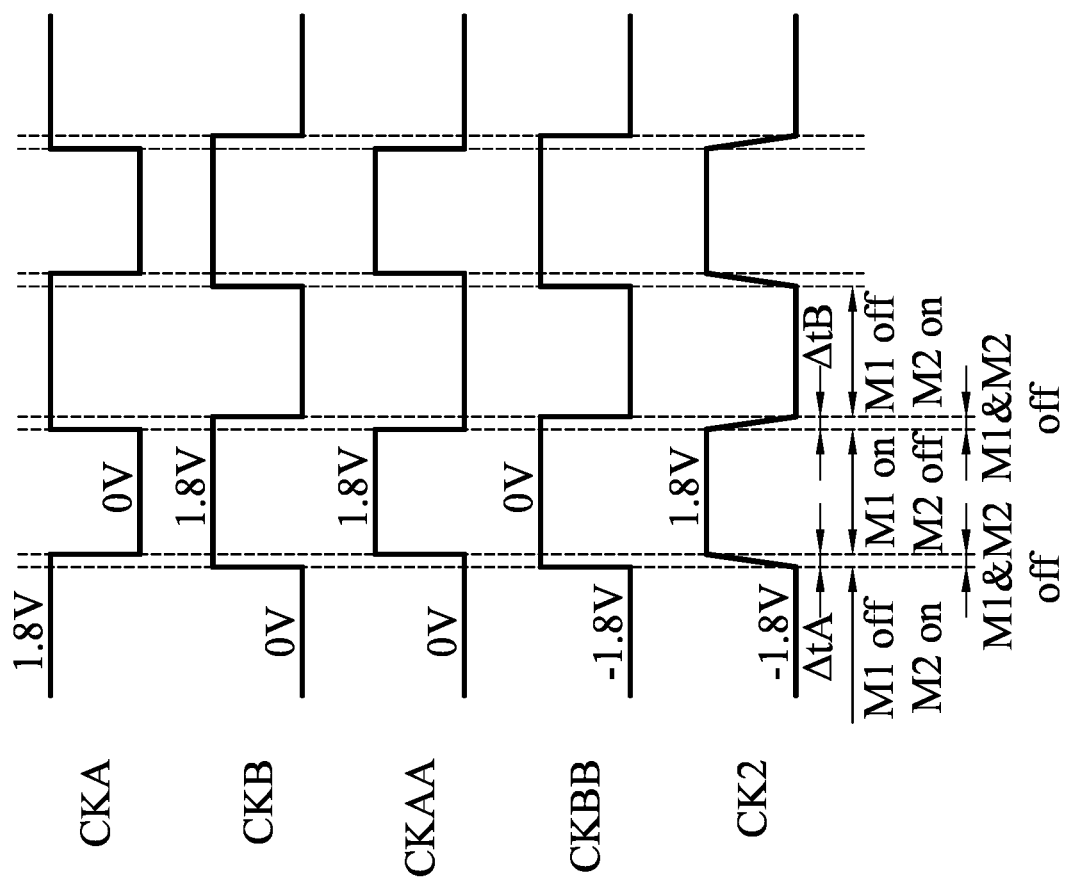
FIG. 5 illustrates the waveforms of the clock signals presented in FIG. 4.

FIG. 5 illustrates the waveforms of the clock signals presented in FIG. 4. Because of the timing controller 402, the low-voltage state of the clock signal CKA is entirely covered by the high-voltage state of the clock signal CKB, vice versus. Especially, the high-state duration of the clock signal CKA is wider than the low-state duration of the clock signal CKB, and the high-state duration of the clock signal CKB is wider than the low-state duration of the clock signal CKA. In this manner, referring to the clock signal CKAA (generated by inverting the clock signal CKA) and the clock signal CKBB (generated by shifting the voltage level of the clock signal CKB), the rising edge of the clock signal CKAA is later than the rising edge of the clock signal CKBB by a timing shift$\Delta$tA, and the falling edge of the clock signal CKBB is later than the falling edge of the clock signal CKAA by a timing shift $\Delta$tB. During the shift timing ($\Delta$tA and $\Delta$tB), the transistor switches M1 and M2 both are open (turned off), and the clock signal CK2 is gradually raised/falls to the ground voltage 0V due to the leakage through the switch SW2 of the negative charge pump 100. Thus, when the clock signal CKAA is switched to high (1.8V) to turn on the transistor switch M1, the voltage difference between the source and drain of the transistor switch M1 is limited to 1.8V (=1.8V−0V). The transistor switch M1 does not have to sustain a huge voltage difference 3.6V, thus avoiding the risk of transistor switch M1's breakdown. Similarly, when the clock signal CKBB is switched to low (−1.8V) to turn on the transistor switch M2, the voltage difference between the drain and source of the transistor switch M2 is limited to 1.8V (=0V−(−1.8V)). The transistor switch M2 does not have to sustain a huge voltage difference 3.6V thus avoiding the risk of transistor switch M2's breakdown.

There may be variants of the clock generator 400. Any clock generator that uses two transistor switches M1 and M2 to couple the output terminal (CK2) to the positive power voltage or the negative power voltage, and makes the output terminal (CK2) floating for a while before turning on any of the transistor switches M1 and M2 is considered within the scope of the present invention.

As shown, the generated control signal CK2 may have a rising slope during the low-to-high transition, and it may have a falling slope during the high-to-low transition.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A negative charge pump, comprising:
    a first switch, controlled by a first control signal, and coupled between a power terminal and a first node;
    a second switch, controlled by a second control signal, and coupled between a ground voltage and a second node;
    a third switch, controlled by a third control signal, and coupled between the first node and the ground voltage;
    a fourth switch, controlled by a fourth control signal, and coupled between the second node and an output terminal of the negative charge pump;
    a first capacitor, coupled between the first node and the second node; and
    a second capacitor, coupled between the ground voltage and the output terminal;
    wherein:
    in a first state, the first switch and the second switch are turned on, and the third switch and the fourth switch are turned off;
    in a second state, the first switch and the second switch are turned off, and the third switch and the fourth switch are turned on;
    in an intermediate state after the second state and prior to the first state, the turning on of the first switch leads the turning on of the second switch;
    the second control signal oscillates between a negative power voltage and a positive power voltage;
    the output terminal of the negative charge pump is regulated at the negative power voltage; and
    the power terminal is at the positive power voltage.

2. The negative charge pump as claimed in claim 1, wherein:
    the second switch is a an NMOS, and has a source terminal coupled to the ground voltage, a drain terminal coupled to the second node, and a gate terminal coupled to the second control signal.

3. The negative charge pump as claimed in claim 2, wherein:
    the fourth switch is an NMOS, and has a source terminal coupled to the output terminal of the negative charge pump, a drain terminal coupled to the second node, and a gate terminal controlled by the fourth control signal; and
    the fourth control signal oscillates between the negative power voltage and the ground voltage.

4. The negative charge pump as claimed in claim 3, wherein:
    the first switch is a PMOS, and has a source terminal coupled to the power terminal, a drain terminal coupled to the first node, and a gate terminal controlled by the first control signal; and the first control signal oscillates between the ground voltage and the positive power voltage.

5. The negative charge pump as claimed in claim 4, wherein:
the third switch is an NMOS, and has a source terminal coupled to the ground voltage, a drain terminal coupled to the first node, and a gate terminal controlled by the third control signal; and
the third control signal oscillates between the ground voltage and the positive power voltage.

6. The negative charge pump as claimed in claim 5, wherein:
the first, second, third, and fourth switches each operate within a low-voltage range that is narrower than a high-voltage range; and
the high-voltage range is from the negative power voltage to the positive power voltage.

7. The negative charge pump as claimed in claim 6, wherein:
while in the first state, the first control signal is at the ground voltage, the second control signal is at the positive power voltage, the third control signal is at the ground voltage, and the fourth control signal is at the negative power voltage; and
while in the second state, the first control signal is at the positive power voltage, the second control signal is at the negative power voltage, the third control signal is at the positive power voltage, and the fourth control signal is at the ground voltage.

8. The negative charge pump as claimed in claim 2, further comprising:
a clock generator, generating the second control signal to be coupled to the gate terminal of the second switch, wherein the second control signal has a rising slope.

9. The negative charge pump as claimed in claim 8, wherein the clock generator comprises:
a first transistor switch; and
a second transistor switch;
wherein:
the first transistor switch couples an output terminal of the clock generator to the positive power voltage after the second transistor switch disconnects the output terminal of the clock generator from the negative power voltage.

10. The negative charge pump as claimed in claim 9, wherein:
the second control signal has a falling slope.

11. The negative charge pump as claimed in claim 10, wherein:

the second transistor switch couples the output terminal of the clock generator to the negative power voltage after the first transistor switch disconnects the output terminal of the clock generator from the positive power voltage.

12. The negative charge pump as claimed in claim 11, wherein the clock generator further comprises:
a timing controller, generating a first clock signal and a second clock signal based on a source clock signal, wherein each high-state duration of the first clock signal is wider than its corresponding low-state duration of the second clock signal, each high-state duration of the second clock signal is wider than its corresponding low-state duration of the first clock signal, and the first clock signal and the second clock signal both oscillate within a first voltage range that is from the ground voltage to the positive power voltage;
an inverter, having an input terminal coupled to the first clock signal, and an output terminal outputting a third clock signal; and
a level-shifter, shifting the second clock signal from the first voltage range to a second voltage range to generate a fourth clock signal, wherein the second voltage range is from the negative power voltage to the ground voltage;
wherein the first transistor switch is turned on or off based on the third clock signal, and the second transistor switch is turned on or off based on the fourth clock signal.

13. The negative charge pump as claimed in claim 12, wherein:
the first transistor switch is a PMOS, having a source terminal coupled to the third clock signal, a drain terminal coupled to the output terminal of the clock generator, and a gate terminal coupled to the ground voltage; and
the second transistor switch is an NMOS, having a source terminal coupled to the fourth clock signal, a drain terminal coupled to the output terminal of the clock generator, and a gate terminal coupled to the ground voltage.

14. The negative charge pump as claimed in claim 13, wherein:
the first and second transistor switches each operate within a low-voltage range that is narrower than a high-voltage range; and
the high-voltage range is from the negative power voltage to the positive power voltage.

* * * * *